United States Patent [19]

Fyrainer

[11] Patent Number: 5,570,901
[45] Date of Patent: Nov. 5, 1996

[54] OCCUPANT RESTRAINING SYSTEM FOR THE DRIVER'S SIDE OF A VEHICLE

[75] Inventor: Heinz Fyrainer, Waldstetten, Germany

[73] Assignee: TRW Repa GmbH, Alfdorf, Germany

[21] Appl. No.: 445,418

[22] Filed: May 19, 1995

[30] Foreign Application Priority Data

May 27, 1994 [DE] Germany ............ 44 18 628.2

[51] Int. Cl.⁶ .................................................. B60R 21/22
[52] U.S. Cl. ........................ 280/730.1; 280/731
[58] Field of Search ................... 280/730.1, 731, 280/732

[56] References Cited

U.S. PATENT DOCUMENTS

| | | | |
|---|---|---|---|
| 2,834,606 | 5/1958 | Bertrand | 280/730.1 |
| 3,642,303 | 2/1972 | Irish et al. | 280/730.1 |
| 3,784,223 | 1/1974 | Hass et al. | 280/730.1 |
| 3,801,123 | 4/1974 | Jira | 280/737 |
| 5,312,131 | 5/1994 | Kitagawa et al. | 280/730.1 |

FOREIGN PATENT DOCUMENTS

| | | |
|---|---|---|
| 0615889 | 9/1994 | European Pat. Off. . |
| 2061717 | 6/1971 | France . |
| 1367132 | 9/1974 | United Kingdom . |

*Primary Examiner*—Kenneth R. Rice
*Attorney, Agent, or Firm*—Tarolli, Sundheim, Covell Tummino & Szabo

[57] ABSTRACT

A combined occupant restraining system for the vehicle driver's side has a gas bag integrated in the steering wheel and a knee impact protector. The steering wheel is secured to a tubular steering shaft section in whose interior space a gas generator is mounted. The flow path defined by the steering shaft section opens directly into the gas bag folded up in the steering wheel. The knee protector comprises a gas cushion, which is inflatable via a flow path connected with the interior of the steering shaft section.

6 Claims, 6 Drawing Sheets

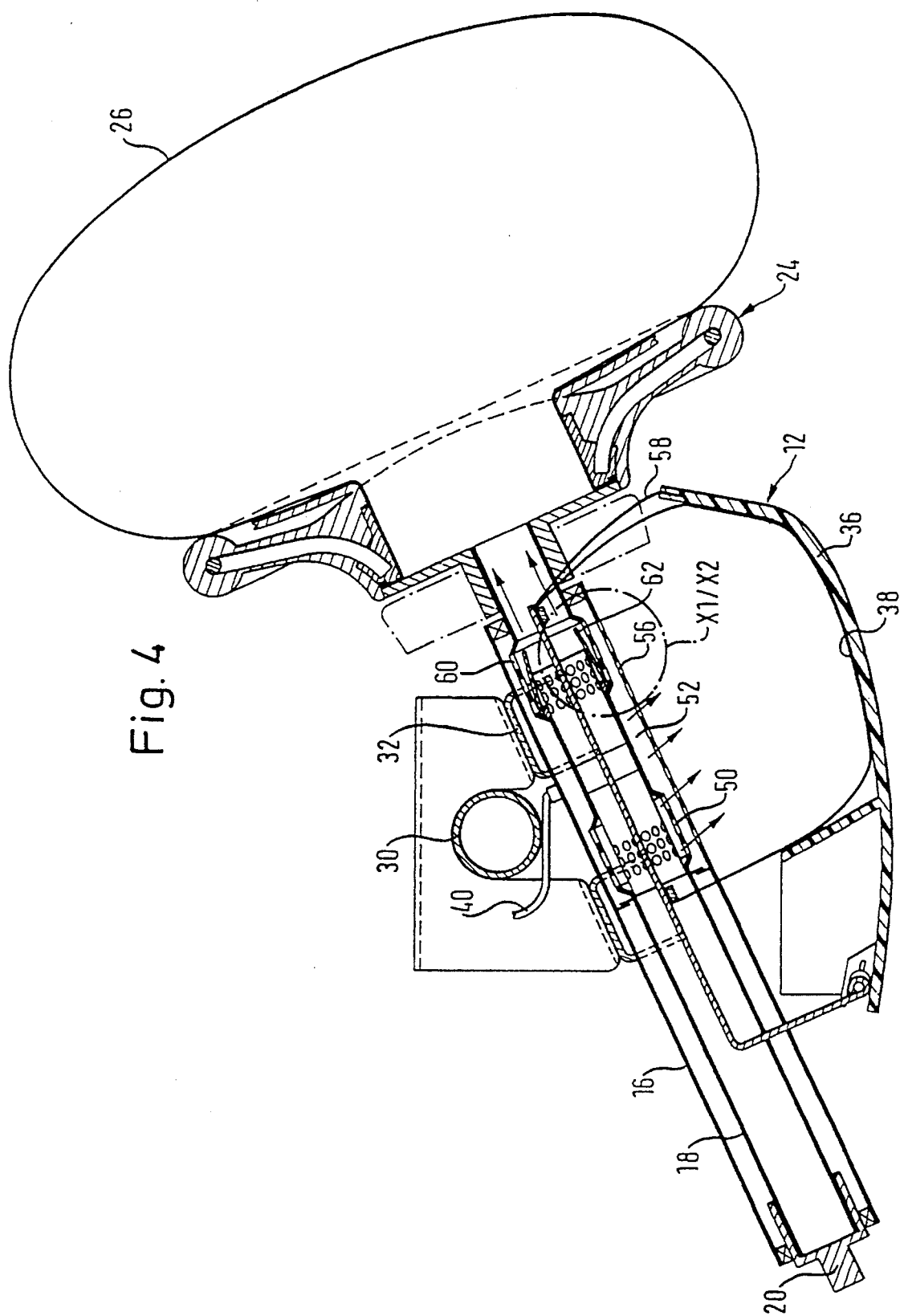

OCCUPANT RESTRAINING SYSTEM FOR THE DRIVER'S SIDE OF A VEHICLE

The invention relates to an occupant restraining system for the driver's side of a vehicle, comprising a gas bag and a knee impact protector.

Such a restraining system is more especially but not exclusively valuable for countries where the use of safety belts is not obligatory. If a safety belt is not being used the knee protector has to assume the function of restraining the lower part of the occupant's body.

Protection of the knees against impact is generally ensured by an anti-impact pad integrated in the dash board of the vehicle, which on impact undergoes a set degree of deformation.

The gas bag integrated in the steering wheel is normally inflated by a gas generator also integrated in the steering wheel hub. Joint accommodation of the folded gas bag and the gas generator in the hub of the steering wheel means that compromises have to be made in the design of the steering wheel owing to the substantial overall volume. The presence of the gas generator furthermore means that the mass of the steering wheel is substantially increased so that the tendency of the steering column to vibrate is increased.

Owing to its permanently present volume necessary for deformation, the knee protector occupies a relatively large amount of space in the dash board. Furthermore the mass of the deforming elements adds to the weight of the vehicle distinctly.

A further point is that the restraining function of such a system is not optimum, because for reasons of comfort and aesthetic design the knee protector is at a relatively large distance from the occupant. Accordingly design to cope with a high knee impact velocity and a correspondingly high impact energy is called for.

The invention is to provide an occupant restraining system for the driver's side of a vehicle, which despite its substantial saving in volume and mass adjacent to the steering wheel and of the knee protector leads to an improved restraining function. In accordance with the invention the steering wheel is secured to a tubular steering wheel shaft section, in whose interior space a gas generator is arranged. The duct constituted by the steering shaft section opens into the gas bag folded up in the steering wheel. The knee protector comprises a gas cushion, which is able to be inflated via a flow path in the interior of the hollow steering shaft section. The occupant restraining system of the invention accordingly provides for active knee protection on the driver's side. The elements adapted to deform, and necessary in conventional knee protector devices, are therefore not now required. The gas generator arranged in the hollow steering shaft section can inflate both the gas bag on the steering wheel and also the gas cushion of the knee protector. Since the gas cushion is arranged nearer to the gas generator and possesses a smaller volume than the gas bag in the steering wheel, the gas cushion therefore inflates before the gas bag. This order of events is however in accord with the timing of restraining operations, since, owing to the active knee protector provided in the invention, restraint of the knees occurs distinctly earlier than restraint of the upper part of the body. The gas cushion is deployed toward the knees of the driver and consequently renders possible a very timely and effective restraining action for the pelvis. Furthermore, the occupant's knees are safeguarded by the relatively soft impact in the gas bag, even although same is covered over by an impact pad, which however is relatively soft and yielding in nature.

Owing to the very early restraint of the pelvic region it is furthermore possible to ensure an early rotary movement of the upper body. Accordingly there is the useful effect of substantial axial transfer of the energy of the occupant's body to the steering wheel and the steering column.

In the preferred embodiment a flow path is provided between the inflated gas bag of the knee protector and the interior of the gas bag with the result that there is a particularly advantageous interaction between the two protective devices. When the knees of the vehicle occupant have plunged into the gas cushion approximately 40 ms after impact or crash of the vehicle, the gas forced out of the same enters the gas bag on the steering wheel, which then after about 60 ms provides the restraining action for the upper body of the occupant. Owing to the resistance to flow in the flow path the distribution of gas and pressure between the gas cushion and the gas bag may be affected and set at optimum values. The amount of gas held ready for the gas cushion in the gas generator is not lost after knee impact by escape into the interior of the vehicle, but makes its contribution of the deployment of the steering wheel gas bag. The gas generator therefore hardly has to be designed to be larger than for a standard steering wheel gas bag.

In accordance with a further advantageous development of the invention the flow path between the gas cushion and the gas bag only permits flow from the former to the latter so that during restraint of the upper body there is no return of gas into the gas cushion, after the same has already performed its restraining function.

An other advantageous, alternative feature of the invention is such that two separately operable gas generators are provided, which are both accommodated in the tubular steering shaft section. The operation of the gas generator associated with the knee protector only takes place if the safety belt is not fastened. Since if the safety belt system is fastened no knee protector is required, after an accident the contingent costs for renewal of the active knee protector system are saved.

Further advantageous developments and convenient forms of the invention will be understood from the following detailed descriptive disclosure in conjunction with the accompanying drawings.

FIG. 1 diagrammatically shows one occupant restraining system on the driver's side of a vehicle.

Figure 1:
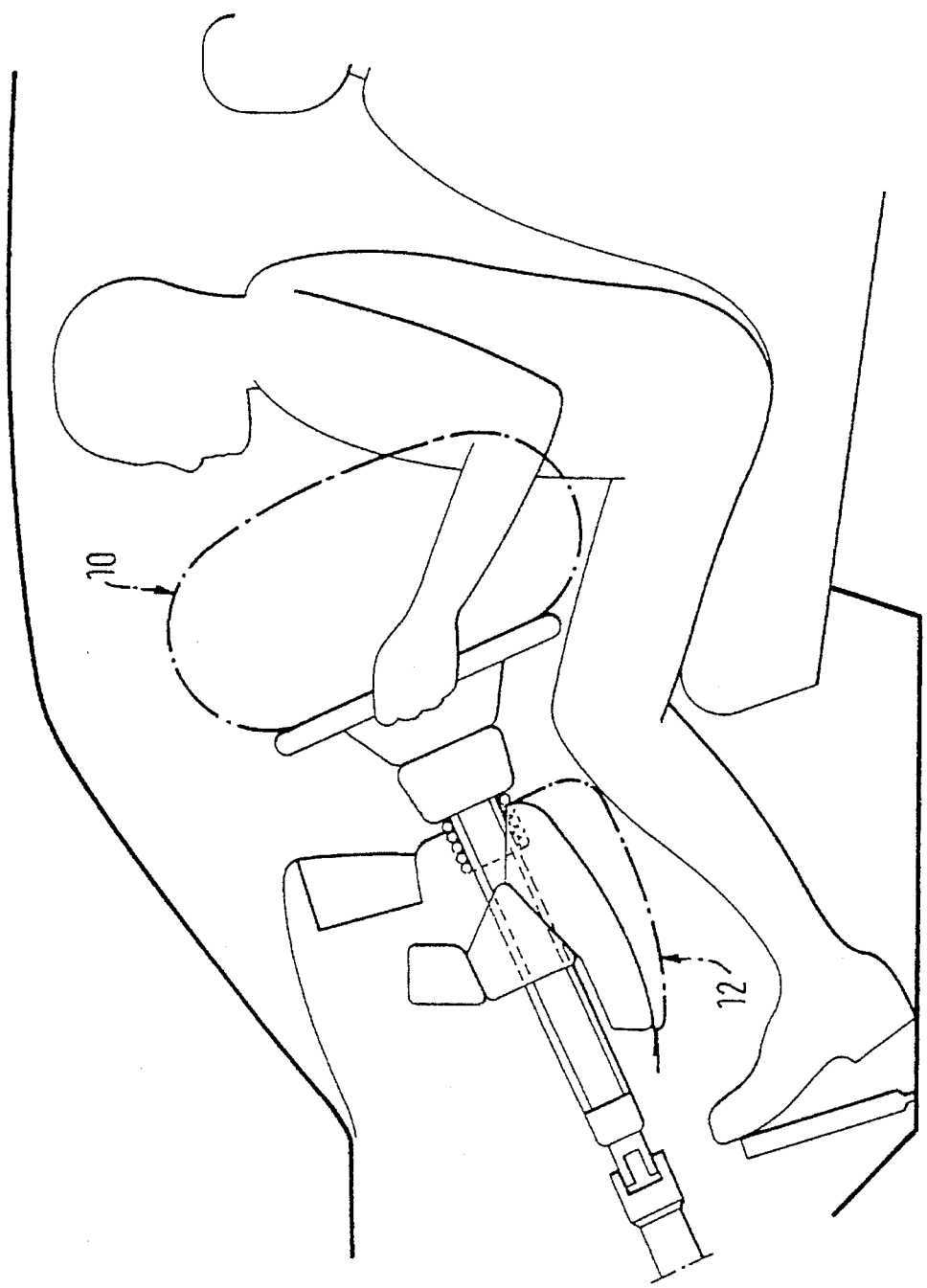
Figure 2:
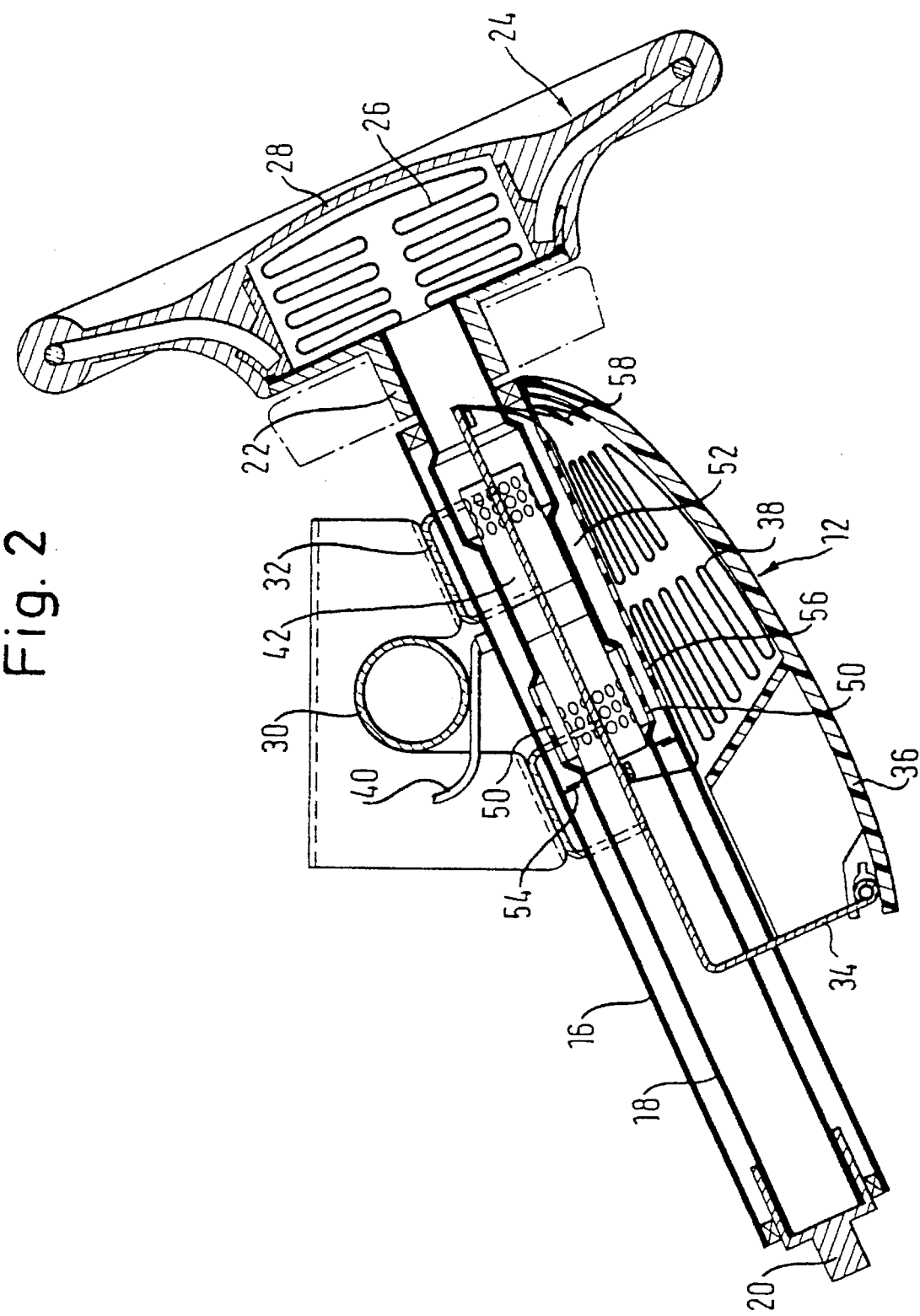
FIG. 2 is an axial sectional elevation of a first embodiment of the restraining system in the inactive state.
Figure 3:
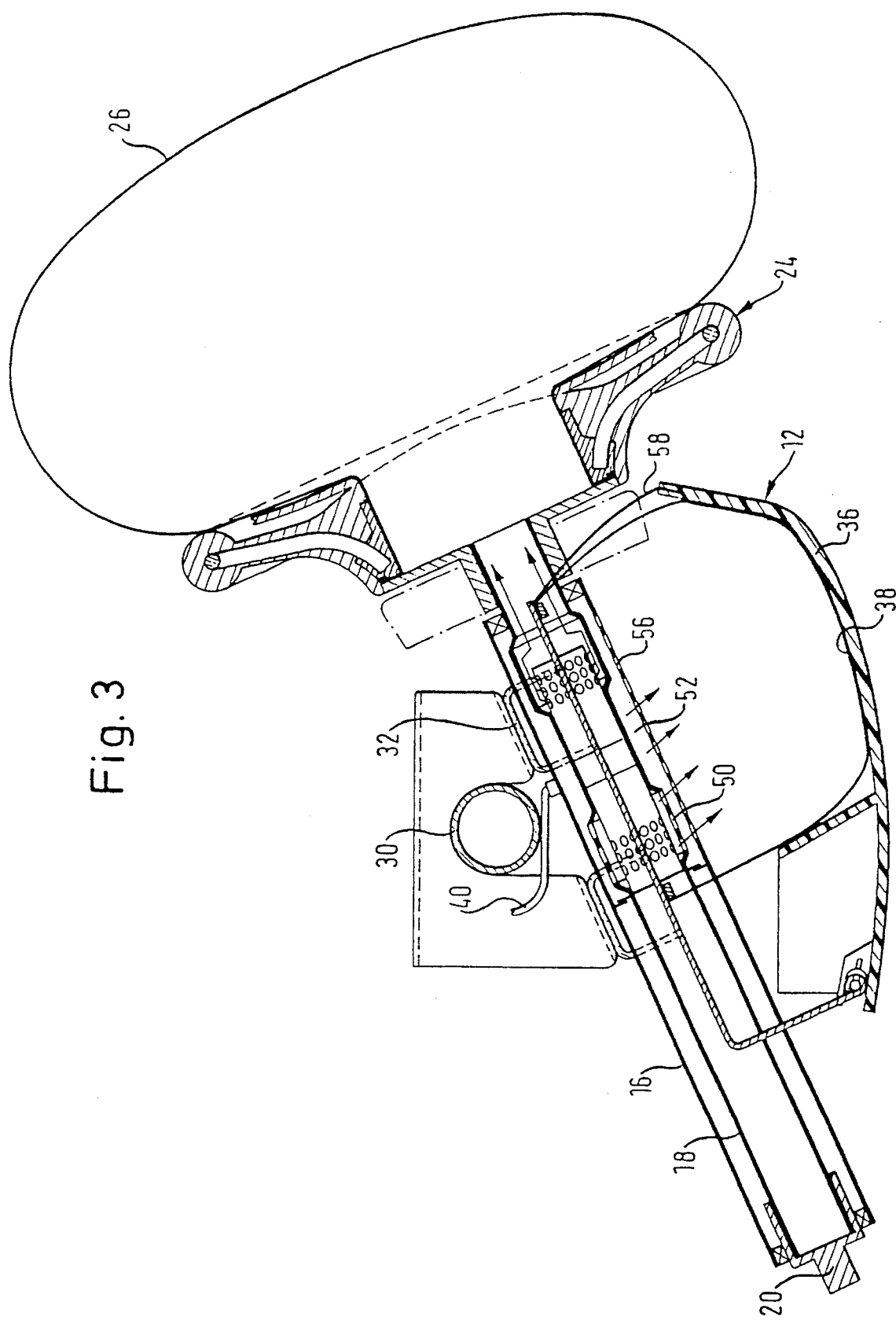
FIG. 3 shows the restraining system in accordance with FIG. 2 in the activated state.

In the case of the occupant restraining system depicted in FIG. 1 for the driver's side of a vehicle an active knee protector is combined with a steering wheel gas bag. In FIG. 1 the gas bag 10, as shown in chained lines, is inflated; reference numeral 12 indicates the knee impact protector, whose operational or activated state is also shown in chained lines. In the active condition of the knee protector 12 the latter is located a short distance in front of the knees of the occupant. On the other hand in the neutral or non-active state it does not require any more space on the lower side of the dash board than conventional cladding, which does not have any restraining function.

Details of the restraining system will now be explained with reference to FIGS. 2 through 5.

In a steering wheel tube 16 borne on the vehicle body a tubular steering shaft section 18 mounted and supported for rotation. At the lower end of the tubular steering shaft section 18 a steering shaft 20 is connected in such a manner as to prevent relative rotation. On the upper end, which extends out from the steering tube column 16, of the hollow steering shaft section 18 a connection bushing 22 of a steering wheel, which is generally referenced 24, is mounted in such a manner as to prevent relative rotation. The steering wheel 24 possesses a bell-like hub, in whose interior space a gas bag 26 is accommodated in a folded condition. The folded gas bag 26 is concealed by a cover 28, in which on the inner side a predetermined fracture line is set.

The knee protector 12 is carried on the vehicle body using a transverse beam 30 constituting part of the vehicle, a bracket 32 attached thereto and a support structure 34 fixed to it. The steering shaft section comprises a plate-like impact pad 36 which constitutes a cover for a folded gas cushion 38.

In the interior of the tubular steering shaft section 18 a pyrotechnic gas generator 42 is arranged which is able to be electrically operated using an electrical lead 40. The gas generator 42 is tubular and at its two axial ends possesses a multiplicity of discharge openings, which are distributed around its periphery. Opposite to the discharge openings the wall of the steering shaft section 18 is flared outward so that an annular gap is produced around the gas generator 42, through which the gases emerging therefrom may flow. On that side of the gas generator 42 facing the steering wheel 24 there is, through the cavity inside the steering shaft section 18, a direct flow path leading into the space within the gas bag 26. At the opposite end of the gas generator 42 a multiplicity of gas passage openings 50 is provided in the outwardly flared radially outer surface of the steering shaft section 18, through which the gas produced by the gas generator may enter an annular space 52, which surrounds the steering shaft section 18 adjacent to gas generator 42 and is delimited to the outside by the wall of the steering column tube 16 and in the lower part by a radial partition wall 54. At its end adjacent to the folded gas cushion 38 the steering column tube 18 is provided with a plurality of gas passage openings 56, which open directly adjacent to the interior of the gas cushion 38.

On operation of the gas generator 42 the gases produced by same firstly flow through the passage openings 50 into the annular space 52 and then through the passage openings 56 in the steering column 16 into the interior of the gas cushion 38, which will now deploy and urge the impact pad 36 outward with the result that it is pivoted around its support point on the support structure 13 until its opening movement is arrested by ribbon-like tethers 58. Simultaneously the gas bag will be filled directly via the flow channel constituted by the steering column 18. Owing to its greater volume and the greater distance from the gas generator 42 however the gas bag 26 will be inflated later than the gas cushion 38. In a field test it was found that the gas cushion 38 inflates after about 40 ms, whereas the gas bag 26 needs approximately 60 ms. This corresponds to the desired timing of events for the restraining function: The holding back of the knees starts after approximately 45 ms and ends at about 70 ms, whereas restraint of the upper body starts after about 60 ms and ends after approximately 90 ms.

The impact pad 36 may be relatively low in weight, soft and yielding, since it does not have to perform substantial deformation work. As regards the geometry of the steering wheel 24 there is great freedom of design, the interior of the steering wheel hub merely having to accommodate the folded gas bag 26, for which purpose a relatively small volume is sufficient. The placement of the gas generator 42 in the hollow steering shaft section 18 also means that the weight of the steering wheel is generally reduced with the result that inclination to vibration is prevented.

Figure 4B:
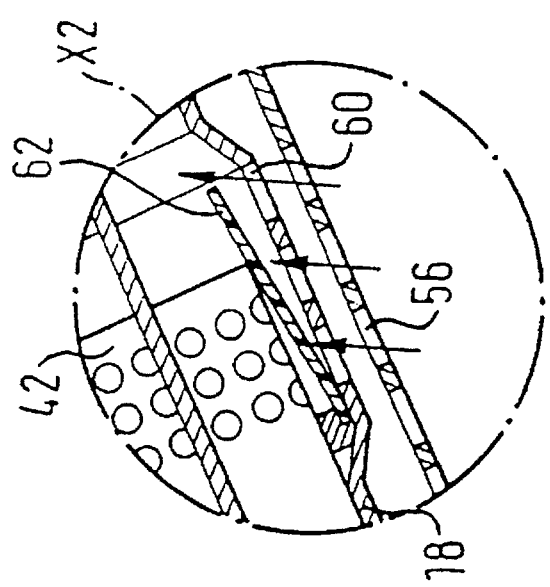
FIG. 4 is an axial sectional elevation of a preferred embodiment of the restraining system in the activated state.
Figure 4A:
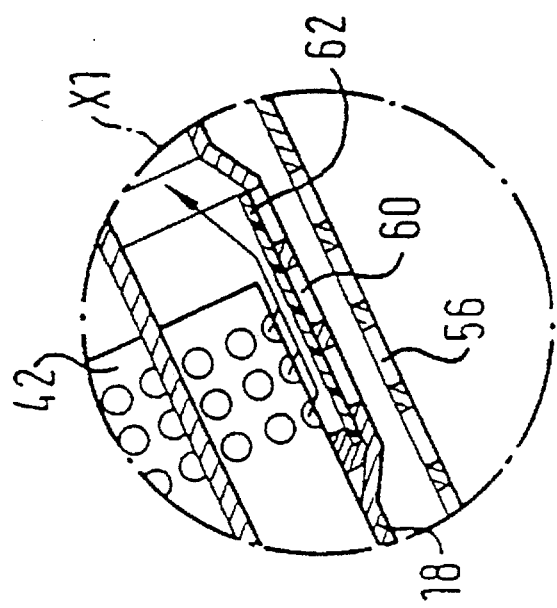

In the case of the embodiment of FIG. 4, there is, unlike the embodiment so far described, a flow path between the interior of the gas cushion 38 and the gas bag 26 but however a selective connection from the gas cushion 30 to the gas bag 26. This flow path is produced by having a large number of gas passage openings 60 in the flared out wall of the of the steering shaft section 18, which surrounds the end, nearest the steering wheel 24, of the gas generator 42. Valve flap elements 62, which cooperate with these passage openings 60, are hinged on the inner side of the steering shaft section 18 and unblock such passage openings 60, if gas flows out from the gas cushion 38 toward the gas cushion 38, but occlude them again automatically on attempt reverse flow of the gas from the gas cushion 38 to the gas bag 26. The resistance to flow of such flow path is set by the size and number of such passage openings 60.

The two possible positions of the valve flaps 62 are separately displayed on a larger scale in FIG. 4, the shut condition thereof being marked X1 and the closed one X2.

Figure 5:
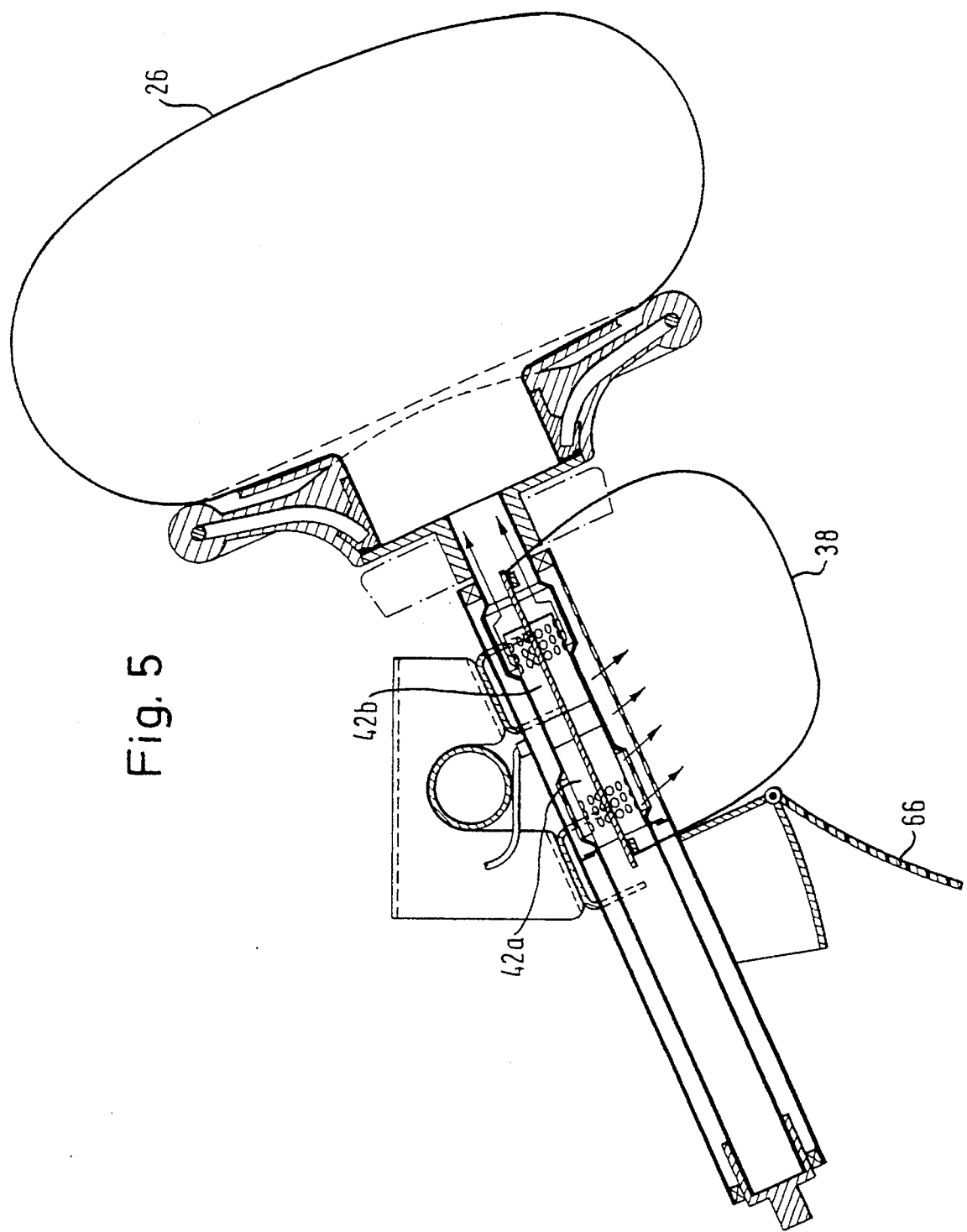
FIG. 5 is an axial sectional elevation of the a further embodiment of the restraining system.

In the case of the modified form of embodiment illustrated in FIG. 5 the gas generator comprises two separately operated units 42a and 42b. The gas generator unit 42a associated with the gas cushion is only operated if the safety belt is not fastened. The condition of the safety belt system may for example be detected by means of a switch.

Furthermore in the case of the modified embodiment of figure 5 the gas cushion 38 is only provided with a protective, concealing cover 66 able to be hinged open, since a force transmitting impact pad is not absolutely necessary to protect the driver's knees.

What is claimed is:

1. A combined driver restraint for a vehicle an inflatable gas bag diposed in a steering wheel of the vehicle;

a knee impact protector with an inflatable cushion; and a gas generator;

said vehicle having a steering shaft, said steering shaft having a tubular hollow shaft section, said gas generator being contained in a chamber defined inside said tubular hollow shaft section of said steering shaft;

said gas and said inflatable cushion having inflation openings connected to said chamber.

2. The restraint system of claim 1 wherein said inflatable cushion is covered by an impact protection pad pivotally mounted on the vehicle bodywork.

3. A combined vehicle driver restraint system comprising a gas bag module for accommodation in a steering wheel of the vehicle and a knee impact protector with an inflatable cushion and a gas generator, said vehicle having a steering shaft with a tubular hollow shaft section and said gas generator being accommodated in a chamber defined within said shaft section, said gas bag and said inflatable cushion having inflation openings connected to said chamber;

said gas generator comprising a pair of gas generator units each accommodated in an associated chamber portion within said shaft section, said gas generator units being adapted to be activated separately from each other and each chamber portion being connected to one of said gas bag and said inflatable cushion.

4. A combined vehicle driver restraint system comprising a gas bag module for accommodation in a steering wheel of the vehicle and a knee impact protector with an inflatable cushion and a gas generator, said vehicle having a steering shaft with a tubular hollow shaft section and said gas generator being accommodated in a chamber defined within said shaft section, said gas bag and said inflatable cushion having inflation openings connected to said chamber;

wherein a selective connection is established between said gas bag and said inflatable cushion permitting flow of gas from said inflatable cushion to said gas bag when pressure within said cushion exceeds pressure within said gas bag.

5. A combined vehicle driver restraint system comprising a gas bag module for accommodation in a steering wheel of the vehicle and a knee impact protector with an inflatable cushion and a gas generator, said vehicle having a steering shaft with a tubular hollow shaft section and said gas generator being accommodated in a chamber defined within said shaft section, said gas bag and said inflatable cushion having inflation openings connected to said chamber;

said steering shaft being accommodated and rotatably supported in a hollow steering column tube fixed to the vehicle bodywork, said inflatable cushion being folded up outside of and adjacent to said steering column, said shaft section having a wall portion with gas passage openings therein and said steering column having a wall portion provided with gas passage openings facing an inflation opening of said cushion.

6. The restraint system of claim 5 wherein flow of gas through said gas passage openings in said shaft section is controlled by flap elements arranged inside of said shaft section and automatically closing said openings when pressure within said shaft section exceeds pressure within said hollow steering column.

* * * * *

UNITED STATES PATENT AND TRADEMARK OFFICE
CERTIFICATE OF CORRECTION

PATENT NO. : 5,570,901
DATED : November 5, 1996
INVENTOR(S) : Heinz Eyrainer

It is certified that error appears in the above-indentified patent and that said Letters Patent is hereby corrected as shown below:

Column 4, line 36, after "vehicle" insert --comprising;--.

Column 4, line 37, change "diposed" to --disposed--.

Cover Page, Inventor's name, change "Heinz Fyrainer" to --Heinz Eyrainer--.

Signed and Sealed this

First Day of July, 1997

Attest:

BRUCE LEHMAN

Attesting Officer

Commissioner of Patents and Trademarks